June 25, 1957 J D BUCHANAN 2,797,061
SOLENOID OPERATED SHUT-OFF VALVE
Filed Sept. 22, 1953
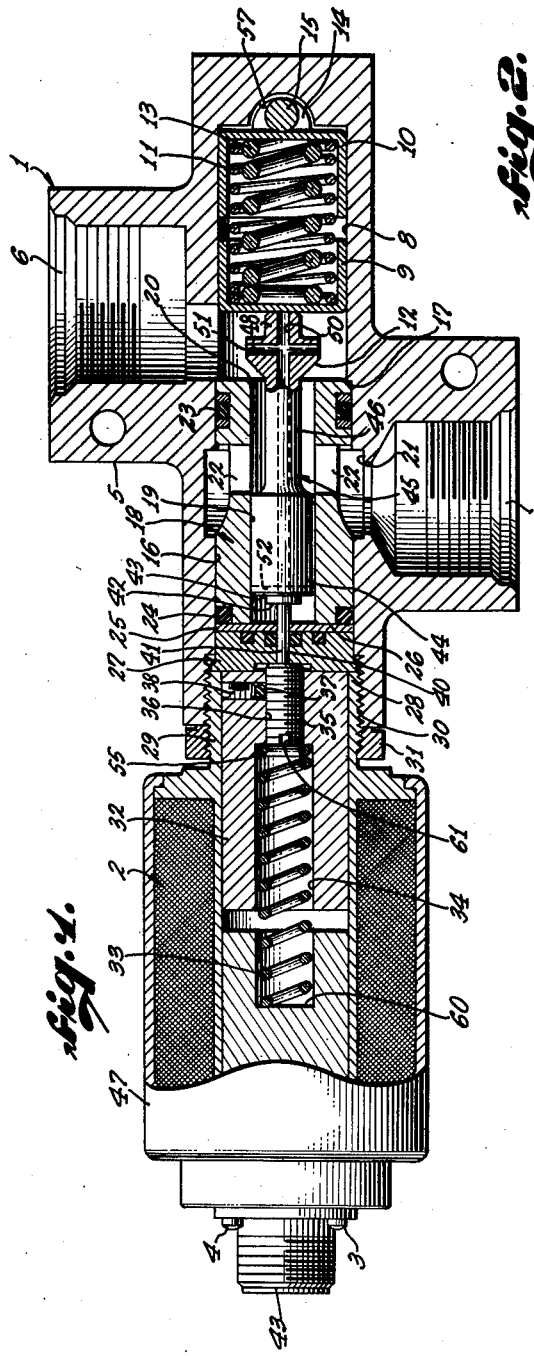
J. D. BUCHANAN,
INVENTOR.
BY W E Beatty
ATTORNEY.

2,797,061
SOLENOID OPERATED SHUT-OFF VALVE

J D Buchanan, Burbank, Calif.

Application September 22, 1953, Serial No. 381,673

3 Claims. (Cl. 251—130)

The invention relates to a solenoid operated shut-off valve and more particularly to such a valve with provisions for manually closing the valve in case of failure of the electrical circuit for the solenoid.

The invention relates to valves for use in controlling high pressure fluid having a pressure of the order of 3,000 lbs. p. s. i., as at present used for the hydraulic control units on an airplane.

An object of the invention is to provide a valve of the character described wherein the high fluid pressure is balanced out in the action of the valve, the valve being controllable by a solenoid for usual operation and also controllable manually in a manner to overcome the solenoid action in the case of an emergency or failure of the solenoid circuit.

A further object of the invention is to provide a valve of the character described wherein the fluid pressure is balanced out when the valve is open, the valve being maintained open by the action of opposing springs. A further object of the invention is to control, either by a solenoid or manually, opposing springs acting on a balanced high pressure valve.

A further object of the invention is to simplify the manufacture of a valve of the character described. This is accomplished by providing a casing having one bore wherein the solenoid, the valve and operating springs are mounted. Preferably, the solenoid casing serves to removably hold the valve in position in the casing.

A feature of the invention is a provision of a plunger extension which can be adjusted to provide a clearance between this extension and the valve operator so that the plunger when withdrawn to its active position will not obstruct the proper closing of the valve, even though the plunger and valve operator may expand due to temperature conditions.

A further feature of the invention is the provision of a high pressure valve which is balanced for both inlet and outlet pressures, with separate means in pushing relation to and free from attachment with the opposite ends of the poppet valve for opening or closing the valve.

For further details of the invention reference may be made to the drawings wherein Fig. 1 is a sectional view of a solenoid operated valve according to the present invention, with the solenoid and valve partly in full lines.

Fig. 2 is a side view in elevation partly in section of the valve of Fig. 1.

Fig. 3 is a plan view showing the handle with parts broken away.

Referring in detail to the drawings, the shut-off valve 1 can be operated either by a solenoid 2 or in the case of an emergency by the handle 39. Solenoid 2 has a casing 47 having an electrical socket 43, held by bolts 3 and 4, for a well known switch-controlled electrical circuit which is not illustrated. Valve 1 has a casing 5 having an inlet 6 and an outlet 7 for the high pressure fluid referred to above. Inlet 6 opens into a dead-end bore 8 serving as a spring barrel and having opposing cups 9 and 10 for a comparatively weak helical spring 11 which is active and under compression when the poppet valve head 12 is open as shown, and a comparatively strong helical spring 13 which is idle and not under tension in the position shown in Fig. 1. Bore 8 is cylindrical and the cups 9 and 10 slide in it. Cup 9 engages and operates a stem 48 on valve head 12. Cup 10 at times can be operated by the eccentric of cam 14 on the shaft 15 which has the operating handle 39.

Bore 8 opens into a larger coaxial bore 16, providing a shoulder 17 for a hollow seat member or cage 18. Seat member 18 has a through bore 19 and its inner end 20 serves as a seat for the valve head 12. The casing 5, at an intermediate portion of bore 16, has an enlarged chamber 21 which communicates with the outlet 7 and with ports like 22 in seat member 18 which connect with the bore 19. When valve head 12 is open as shown, the fluid flows from inlet 6 past valve head 12 to the bore 19 and out ports 22 to the outlet 7.

Seat member 18 at its inner end has a ring seal 23 to prevent leakage from bore 8 to the outlet 7 when valve head 12 is closed. The outer end of seat member 18 also has a ring seal 24 to seal against leakage outwardly of bore 16. The seat member 18 is held against the shoulder 17 and the outer end of bore 19 is closed by a disk 25 which bears against seal 24 and the outer end 26 of seat member 18. Against disk 25 bears a block 27 held in position by the inner end 28 of the threaded sleeve 29 of casing 47 of solenoid 2. Sleeve 29 threads into the socket 30 at the outer end of bore 16. Sleeve 29 has a lock nut 31.

The solenoid 2 has a plunger 32 which when the solenoid is idle or not energized, is urged by a helical spring 33, inwardly to the position shown against block 27. The main point is that spring 33 is stronger than spring 11, but weaker than spring 13 for reasons which will be explained later. Spring 33 has an abutment 60 and is arranged in a central spring barrel 34 in the plunger 32 and at its inner end it bears against a shoulder 55 at the junction of spring barrel 34 and threaded bore 36.

Threaded in bore 36 is a longitudinally adjustable set screw 35. The set screw 35 serves as an adjustable extension for the plunger 32 and it is adjusted so that there is a small clearance such as .005 in. between the plunger extension 35 and the push rod 41 when the plunger is retracted by the solenoid 2 to its active position. This clearance compensates for expansion of parts operated by plunger 32, to make sure that the plunger 32 when retracted will not obstruct or prevent the proper closing of valve head 12 to its seat 20. The plunger extension or set screw 35 is locked in position by set screw 38 acting on a nylon plug 37. Plunger 32 is removable from solenoid 2 and the set screw 35 which serves as a plunger extension can be adjusted by a kerf or screw driver slot 61.

The block 27 has a central slide bearing 40 for a push rod or plunger 41 having an enlarged head 42 which bears against the outer end 43 of a piston 44 on the valve member 45. Push rod 41 is in pushing relation to the plunger extension 35 and piston 44 and is free from attachment to either one of them. Piston 44 slides in bore 19 and it is connected to the valve head 12 by a reduced stem 46 which is smaller than bore 19 to provide for fluid flow when valve head 12 is open. Valve head 12 is balanced by the inner end of piston 44 for pressure in outlet 7 when valve head 12 is closed.

Valve member 45 has a longitudinal through passage 50 connected with cross passage 51 in valve head 12 and with one or more cross passages 52 at the outer end of piston 44. The passages 52 are open channels in the outer end of piston 44. The passages 50 and 51 are open at all times to the inlet 6, and as the diameter of seat 20 is the same as the diameter of piston 44, valve head 12 is balanced for fluid pressure at all times whether valve head 12 is open or closed.

As shown in Fig. 1, the inner face of block 27 has an O-ring seal which bears against the outer face of disk 25 and an O-ring around plunger 41 and also bearing against the outer face of disk 25, to seal against leakage from bore 19 into the solenoid 2.

Shaft 15 is mounted in a through cross bore 56 in the casing 5 and has an intermediate larger chamber 57 in which the eccentric 14 operates. Shaft 15 has ring seals 58 and 59 at its opposite ends. As shown in Fig. 3, handle 39 can swing 180°, being limited by a stop-pin 62 on the handle shaft 15 and the shaft retaining screws 63 and 64 which serve as stops.

When the solenoid 2 is not operated or idle as shown in Fig. 1, the spring 33 acting through the plunger extension 35 and push rod 41 and its head 42 which bears on piston 44, moves valve 12 to the open position shown, overcoming the weaker spring 11, and not being influenced by the stronger spring 13 which is idle at this time.

When solenoid 2 is operated, plunger 32 by reason of its shoulder 55 retracts the inner end of spring 33 to remove its influence on valve member 45, whereupon spring 11 urges the valve head 12 to its closed position, the valve member 45 being also balanced for fluid pressures in this position. If there is a failure in the electrical circuit for the solenoid 2 at a time when valve head 12 is open, it can be closed by operating handle 39 which compresses spring 13 which overcomes the weaker spring 33 and moves valve head 12 to closed position against its seat 20.

The following values are given by way of example and illustration and are not to be construed as a limitation. The weakest spring indicated at 11 may put a load of 16 to 20 lbs. on valve 12 to close this valve when solenoid 2 is active and its plunger 32 retracted, whereas the stronger plunger spring 33 may put a load of 50 to 55 lbs. on valve 12 which is sufficient to overcome spring 11 when solenoid 2 is idle. The strongest spring 13 may have a high rating such as 1500 lbs. so that it is moved bodily by cam 14 until valve head 12 seats. The drawing shows by way of example the parts in full scale, and the valve head 12 moves .140 in. while cam 14 moves .170 in., the difference or .030 in. movement against the strongest spring 13 being sufficient to put a load of about 125 lbs. on valve head 12 when it is seated, this load being sufficient to overcome plunger spring 33. When solenoid 2 is operated to remove the load of spring 33 on valve 12, the spring 11 extends in urging valve head 12 to closed position, but the strongest spring 13 does not extend as it is not under compression with cam 14 idle and when valve head 12 is open as shown in Fig. 1.

Various modifications may be made in the invention without departing from the spirit of the following claims.

I claim:

1. A valve comprising a casing having a dead-end bore open at its outer end, said casing having an inlet and an outlet opening into said bore, said bore having an inner end of reduced size providing a shoulder and a hollow seat member in the outer end of said bore and fitting against said shoulder, said seat member having a bore and a valve member having a piston slidable therein, the outer end of said seat member bore providing a seat and said valve member having a valve head, said piston being movable outwardly to close said valve head to said seat, said casing having a neck at the outer end of said casing bore, a solenoid having a casing fitting said neck, said solenoid having a plunger, a spring acting on said plunger and a plunger rod between said plunger and said piston, said reduced bore comprising a spring barrel having opposing cups slidable therein, two helical springs between said cups and one of said two springs being weaker than said plunger spring and the other thereof being stronger than said plunger spring, one of said cups facing said valve head and a rotary cam at the end of said dead-end bore for operating said other cup.

2. A valve comprising a casing having an inlet and an outlet, a valve member therefor having a piston and valve head, a cooperating seat, a solenoid having a plunger, said plunger having a spring urging said plunger to idle position, a push rod operated by said plunger for urging said valve head to open position, an adjustable extension on said push rod and means for securing said extension at a position providing a clearance between said extension and said push rod when said plunger is withdrawn and said valve head is closed, and means for urging said valve head to closed position.

3. A valve comprising a casing having a dead-end bore, the inner end portion of said bore being of reduced diameter and providing a shoulder at its junction with the outer portion of said bore, a hollow seat member fitting the outer end portion of said bore and abutting said shoulder, said seat member having a bore having an inner end providing a seat and a poppet valve for said seat, said poppet valve having a piston slidable in said seat member bore, means comprising a solenoid having a casing having a neck secured to the outer end of said casing bore for holding said seat member in position, a disk fitting in the outer end of said casing bore and closing the outer end of said seat member bore and having a bearing, said solenoid having a plunger, and a push rod in said bearing in pushing relation to and free from attachment with said plunger and said piston, a spring for operating said plunger to open said poppet valve when said solenoid is idle, and another spring for closing said poppet valve when said solenoid is active.

References Cited in the file of this patent

UNITED STATES PATENTS

| 1,046,399 | Mueller | Dec. 3, 1912 |
| 1,406,333 | Beach | Feb. 14, 1922 |
| 1,449,642 | Warenskjold | Mar. 27, 1923 |
| 1,898,228 | Thompson | Feb. 21, 1933 |
| 2,031,478 | Gray | Feb. 18, 1936 |
| 2,229,499 | Fisette | Jan. 21, 1941 |
| 2,392,741 | Hurlburt | Jan. 8, 1946 |

FOREIGN PATENTS

| 790,637 | France | Sept. 9, 1935 |
| 682,049 | Germany | Sept. 14, 1939 |
| 465,736 | Canada | June 6, 1950 |
| 672,696 | Great Britain | May 28, 1952 |